United States Patent Office 3,011,718
Patented Dec. 5, 1961

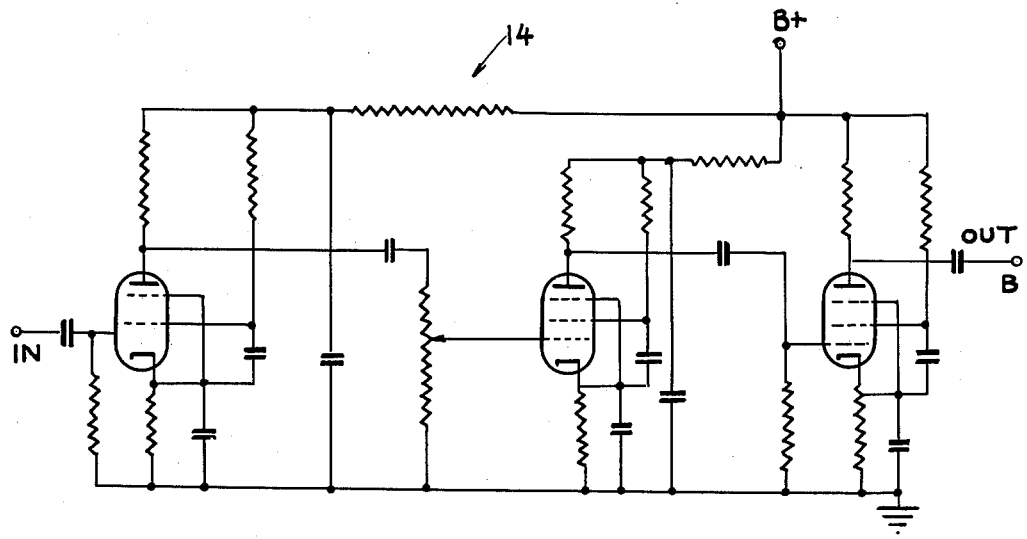
Fig. 3
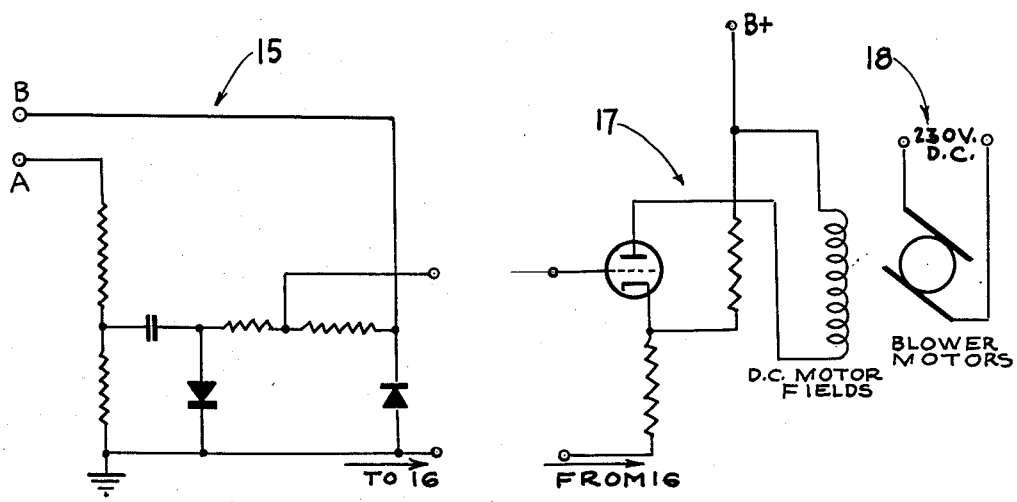
Fig. 4
Fig. 5

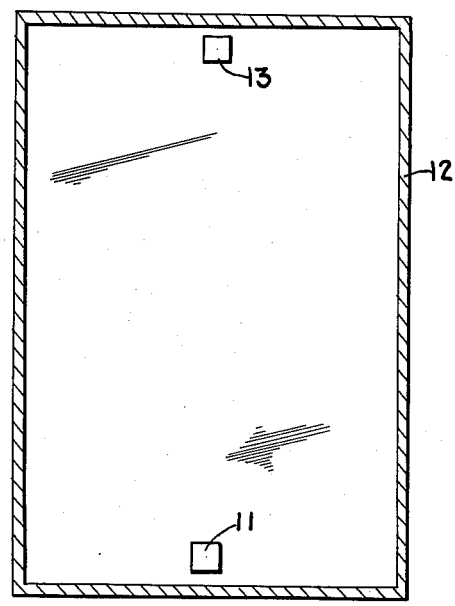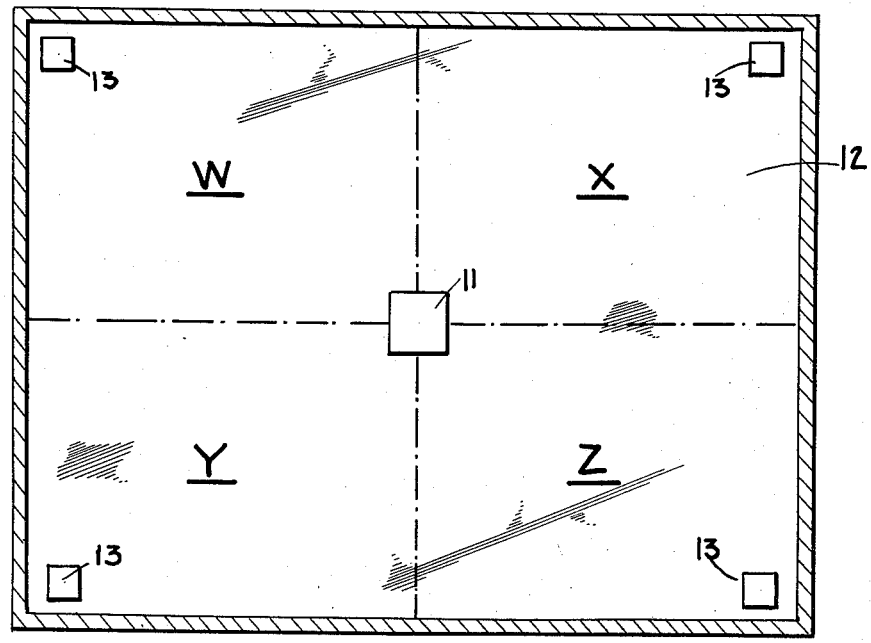

3,011,718
CONTROL NETWORK FOR AIR CONDITIONING UNITS
Ernest A. Joerren, Brooklyn, N.Y., and Samuel M. Bagno, Belleville, N.J., assignors to Specialties Development Corporation, Belleville, N.J., a corporation of New Jersey
Filed Dec. 17, 1958, Ser. No. 781,148
10 Claims. (Cl. 236—1)

The present invention relates to controlling air conditioning systems for heating and/or cooling spaces to maintain the temperature at a desired value, and, more particularly, to controlling such systems wherein one or more units are utilized for conditioning the air in large spaces such as theatres, meeting halls, museums, exhibition halls, armories, auditoriums, sports arenas and similar enclosures.

Such enclosures are capable of accommodating a large number of people, and the number of people present may vary greatly within short intervals of time. Since the average human being generates body heat at about 7 B.t.u. a minute, the temperature in the enclosure changes in proportion to the number of persons present, whereby the air supplied to the enclosure must be varied from time to time to maintain the temperature at a comfortable level.

Heretofore, attempts have been made to control the temperature of such enclosures by one or more temperature responsive devices. The difficulties of such devices are that they only sense the temperature at the spot where they are located and are incapable of scanning the entire enclosure. Also, they only respond after an uncomfortable condition has been created and enable the system to attempt to correct this condition after persons have been exposed to it. This creates another complication in that, while the system is adjusted for supplying more air, a great number of persons may leave the enclosure whereby the enclosure is over-cooled and is rendered uncomfortable in an opposite sense.

More recently, attempts have been made in large theatres to monitor the temperature therein over a greater area by having each usher carry a temperature responsive device as he moves about at his station and having him report the observed temperature at intervals to the engineer operating the air conditioning system who then adjusts the same manually to cope with the conditions reported to him. This method still is subject to all the difficulties mentioned hereinbefore, except that temperature readings can be taken at a greater number of spots.

A still further difficulty is that the temperature control devices for such air conditioning systems do not take into account the freshness of the air in the enclosure and its psychrometric effect. Since an increase in the carbon dioxide content of the air speeds up human metabolism, human beings first sense and then generate more heat which first creates an uncomfortable condition sensible to the individual and then an actual over-heated condition within the enclosure. This condition is aggravated where tobacco smoking is permitted.

Accordingly, an object of the present invention is to provide a network for controlling air conditioning systems which is not subject to the foregoing difficulties and disadvantages.

Another object is to provide such a network which controls the air conditioning system in response to the number of persons present in the enclosure to maintain the temperature at a comfortable level at all times.

Another object is to provide such a network which anticipates a temperature condition about to be created and controls the air conditioning system to compensate for the condition prior to its inception.

Another object is to provide such a network which further is sensitive to changes in the carbon dioxide content of the air independently of changes in temperature and which controls the supply of the conditioned air and/or a greater volume of fresh air to reduce the carbon dioxide content to a comfortable level.

A further object is to accomplish the foregoing in a practical and reliable manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects generally are accomplished by providing a network including means for generating energy at an ultrasonic frequency, transmitting means electrically connected to the output of the generating means for radiating sound energy at an ultrasonic frequency into the space to be monitored, means for receiving the radiated energy, means electrically connected to the output of the energy generating means and the output of the radiated energy receiving means for detecting differences in amplitude between the generated energy and received energy due to changes in the acoustical properties in the space and for producing an output in response to such differences, and means responsive to the output of the detecting means for controlling the air conditioning system.

Such a network takes into account that the average human body generates and radiates a predictable quantity of heat, and also that the average size human body has a predictable acoustic absorption. Thus, the heat that would be radiated by a number of persons in an enclosure can be sensed by the acoustic absorption caused by such persons. In this manner, the radiated and received energy signal is weakened as the number of persons in the space increases and the value of the difference in amplitude between this signal and the signal generated can be utilized to adjust the controls of the air conditioning system to supply a greater volume of air to compensate for the anticipated increase of body heat introduced into the space. Likewise, as the number of persons in the space decreases the value of the difference in amplitude between these signals can be utilized to adjust the controls to supply warmer air or a lesser volume of air to compensate for such change in condition.

Such a network further takes into account that the increase in carbon dioxide content in the air within the space accelerates metabolism and causes the persons to feel uncomfortably warmer while the temperature within the space actually is at a supposedly comfortable level and sufficient cooling is provided to take care of the body heat radiation of the number of persons present. Such a condition can be sensed by generating and radiating energy at a frequency to take advantage of the effect thereon due to molecular relaxation in carbon dioxide which occurs at energy frequencies of about 20 kc. p.s. in pure carbon dioxide or at 60 kc. p.s. when diluted in air.

This phenomenon is due to the kinetic energy of the molecules of carbon dioxide dividing their response as compressional and rotational. If there is a change of velocity in phase with the change in pressure, no sound energy is absorbed by the gas. However, the change of pressure may result at certain frequencies in a rotational change of the gas molecule which absorbs energy and does not return it in time to propagate the sound. Gases such as carbon dioxide and water vapor exhibit this phenomenon at certain frequencies and concentration so that sonic or molecular relaxation can be used as a continuous measure at ultrasonic frequencies of the condition of the air in an enclosure.

The absorptive quality of clothing is another indication of the population density in the enclosure. Thus, by generating and radiating energy at a frequency of about 60 kc. p.s. and measuring its absorption it becomes possible to continually monitor the psychrometric conditions where desired.

A preferred embodiment of the invention has been chosen for purposes of illustration and description, and is shown in the accompanying drawings, forming a part of the specification, wherein:

FIG. 3 is a wiring diagram of a conventional amplifier.

FIG. 4 is a wiring diagram of a detector suitable for use in the network.

FIG. 5 is a wiring diagram of a control device suitable for use in the network.

FIG. 6 is a schematic view of an enclosure wherein the present invention is utilized in its simplest form.

FIG. 7 is a schematic view of an enclosure wherein the present invention is utilized to control a more elaborate air conditioning system.

Figure 1:
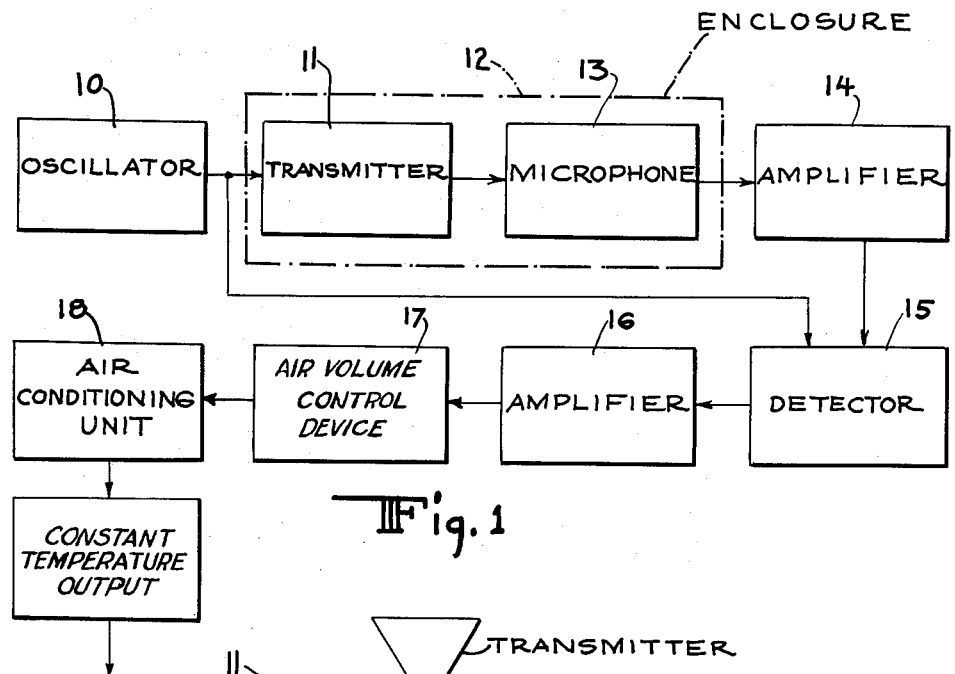
FIG. 1 is a block diagram of a network in accordance with the present invention.

Referring to FIG. 1 of the drawings in detail, a network is shown which generally comprises an oscillator 10 for generating energy at an ultrasonic frequency, a transmitter 11 electrically connected to the output of the oscillator for radiating energy through the space within an enclosure 12, a microphone 13 within the space for receiving the radiated energy, an amplifier 14 for adjusting the amplitude of the radiated and received signal to a desired value, a detector 15 electrically connected to the output of the oscillator and the output of the microphone (through amplifier 14) for detecting differences in amplitude between the generated energy and the radiated and received energy due to changes in the acoustical properties in the space and for producing an output in response to such differences, an amplifier 16 for increasing the strength of the output of the detector, if required, and a control device 17 operable by the output of the amplifier 16 for regulating the output of an air conditioning unit 18.

Figure 2:
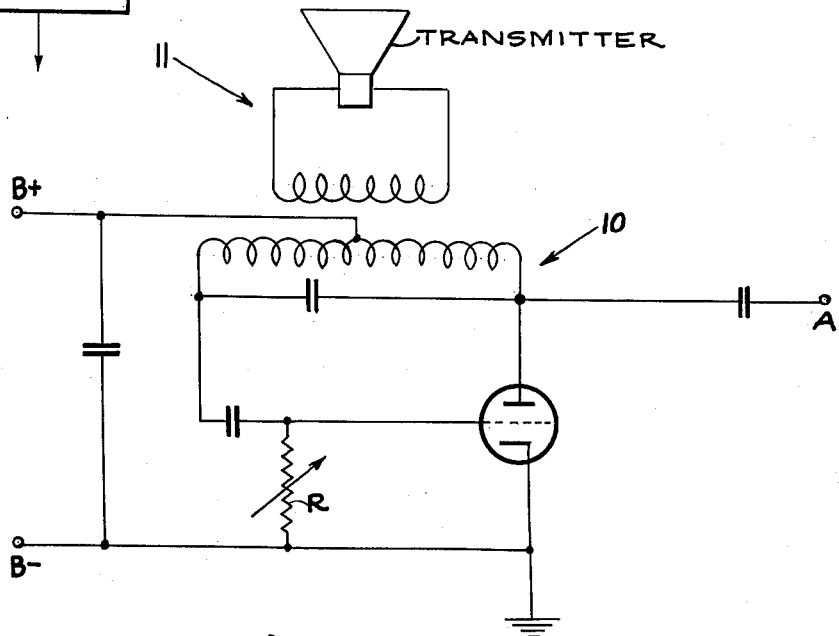
FIG. 2 is a wiring diagram of an oscillator particularly adapted for use in the network.

The oscillator 10, shown by way of example in FIG. 2, is of the pulse generator type which generates damped pulses at a frequency of about 60 kc. p.s. at one second intervals. An excellent pulse generator is a self-blocking Hartley oscillator, such as shown, wherein the grid resistor R is made sufficiently large to block the oscillator, and is adjusted for the proper blocking rate. Other types of ultrasonic frequency oscillators may be utilized under less exciting conditions than contemplated to the present invention which prevent the formation of standing waves in the enclosure. For example, a frequency modulated type oscillator may be employed.

The transmitter 11 and the microphone 13 both may be electroacoustical transducers capable of converting electrical wave energy to acoustical energy and converting acoustical energy to electrical wave energy at ultrasonic frequencies. Such a transducer is illustrated and described in United States Letters Patent No. 2,832,952.

The amplifier 14, shown by way of example in FIG. 3, is constructed and arranged to have an output signal which is substantially equal in amplitude to a predetermined portion of the generated signal directly transmitted from the oscillator 10 to the detector 15, when the air conditioning system is set to provide a desired temperature in the space and the acoustical absorption in the space is of a known value, so that the detector serves to maintain this condition while the acoustical absorption does not change. For example, this could be accomplished by adjusting the amplifier 14 to make the signals equal in amplitude and setting the air conditioning system to maintain the desired temperature in the space while no persons are present. Thereafter, when persons enter the space the acoustical absorption of the space will increase proportionately to the number of persons, and the degree of unbalance between the signals likewise is proportionately increased, whereby the detector will now function to control the resetting of the air conditioning system to supply the proper output for maintaining the space at the desired temperature and other psychrometric conditions.

In order to accomplish the foregoing, the amplifier 14 comprises a conventional three stage 120 D.B. adjustable gain amplifier with resistance coupling between stages.

The detector 15, shown by way of example, in FIG. 4, as previously indicated, is constructed and arranged to have an output which is proportionate to the difference in amplitude or degree of unbalance between a fixed portion of the generated signal corresponding to the normal attenuation in the enclosure between transmitter and receiver, and the amplified radiated and received signal. This may be accomplished by providing a detecting system which comprises an attenuator connected to the oscillator and feeding a fixed portion of the generated signal into a rectifier across which is developed a positive D.C. potential in respect to ground. The output of the amplifier is connected to a rectifier which provides a negative D.C. potential in respect to ground. These two potentials are added and the resultant voltage is an indication of the unbalance.

The amplifier 16 is of a conventional design which merely serves to increase the output of the detector 15 to a value to operate the control device 17.

The control device 17, shown by way of example in FIG. 5, is a network which has an output capable of adjusting the conventional controls of the air conditioning means 18 in response to the electrical input from the amplifier 16. The control device shown herein comprises a speed control network for controlling the speed of the blower of the air conditioning means feeding the air ducts and for controlling the air exhaust system from the enclosure.

The network to this point has been described as being responsive to the number of persons in the space of the enclosure 12 and now will be described with reference to responsiveness to the carbon dioxide content within the space. After the air conditioning system has been operating for some time at its selected setting with no persons present in the space and the output of the detector is zero, the space will be filled with fresh air of a normal carbon dioxide content. As already described, when the number of persons present in the enclosure increases, more air is supplied by the air conditioning system in response to increased acoustical absorption and the resultant weakening of the radiated and received signal. Thus, the air supplied to the space is always at the desired temperature for the number of persons present, whereby an increase in the carbon dioxide content in the air within the space beyond a tolerable level can be sensed as an additive effect and further adjustment of the air conditioning system is made in response thereto, to supply sufficient air capable of counteracting uncomfortableness due to increased metabolism. This would be particularly important during exciting occurrences.

In FIG. 6, an air conditioned enclosure 12 is shown with the transmitter 11 at one end and the receiver or microphone 13 at the opposite end of the enclosure so that the radiated sound energy is affected by the acoustical properties within the enclosure between the transmitter and the receiver.

In FIG. 7, a relatively large enclosure 12 is shown which may be air conditioned by several air conditioning units 18, each unit serving to condition one of the sections W, X, Y and Z and including controls therefor. The control network for such an enclosure may be utilized by placing a single transmitter 11 in the middle of the enclosure, and placing a receiver 13 in each corner of the enclosure so that the radiated sound energy is affected by the acoustical properties of the enclosure sections between the transmitter and the receivers. In such an arrangement, each receiver controls an air conditioning unit through an amplifier 14, detector 15 and control device 17 network, with the output of the oscillator being electrically connected to each of the detectors 15.

In cases where the enclosure such as a large theatre includes an orchestra section and one or more large balcony sections, each serviced by its own air conditioning unit to meet its environmental needs, each section may be treated as an independent enclosure with a transmitter 11 at one end and a receiver 13 at the opposite end.

While the network has been described primarily with respect to varying the volume of the air supplied to the space at a constant temperature, it will be understood that the network is equally applicable in controlling the temperature of air supplied by the air conditioning system with or without manual or automatic volume control.

From the foregoing description, it will be seen that the present invention provides a novel and useful network for controlling the temperature and freshness of the air in large enclosures wherein the number of persons present may change rapidly from time to time and the air can be contaminated by an intolerable carbon dioxide content. The network is economical in construction and is reliable in operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In an air conditioning system controlling network for a space within an enclosure having variable acoustical absorptive load properties produced by the number of absorptive line bodies present in the enclosure, the combination of means for generating a signal at an ultrasonic frequency, transmitting means electrically connected to the output of said generating means for radiating sound energy at an ultrasonic frequency through the space whereby a portion of the energy is absorbed, means for receiving the radiated sound energy, means electrically connected to the output of said energy generating means and to the output of said radiated energy receiving means for detecting differences in amplitude between the generated signal and the radiated and received signal due to changes in the acoustical absorptive load properties in the space and for producing an output in response to such differences, and means responsive to the output of said last mentioned means for controlling the air conditioning system.

2. In a network according to claim 1, wherein means are provided for making the amplitude of the generated signal and the received signal substantially equal when a predetermined acoustical condition exists in the space.

3. In a network according to claim 1, wherein said generating means is constructed and arranged to cause said transmitting means to radiate sound energy at about 60 kilocycles a second.

4. In a network according to claim 3, wherein said generating means is constructed and arranged to provide the pulses at about one second intervals.

5. An air conditioning system for a space within an enclosure having variable acoustical absorptive load properties produced by the number of absorptive line bodies present in the enclosure, the combination of a unit for conditioning air to be supplied to the enclosure means for generating a signal at an ultrasonic frequency, transmitting means electrically connected to the output of said generating means and located in the enclosure for radiating sound energy at an ultrasonic frequency through the space whereby a portion of the energy is absorbed, means in the enclosure for receiving the radiated sound energy, means electrically connected to the output of said energy generating means and to the output of said radiated energy receiving means for detecting differences in amplitude between the generated signal and the radiated and received signal due to changes in the acoustical absorptive load properties in the space and for producing an output in response to such differences, and means responsive to the output of said last mentioned means for controlling said air conditioning unit.

6. A network according to claim 1, wherein said generating means is of the type which is constructed and arranged to eliminate standing waves.

7. In a network according to claim 1, wherein said generating means cause said transmitting means to radiate sound energy into the enclosure at a frequency sensitive to molecular relaxation of carbon dioxide diluted in air within the enclosure, and said detecting means at a given absorptive load within the enclosure being capable of detecting the effect of such molecular relaxation on the radiated energy.

8. A network according to claim 7, wherein the radiated sound energy has a frequency of about 60 kilocycles a second.

9. A network according to claim 8, wherein the sound energy is radiated in pulses at about one second intervals.

10. A network according to claim 7, wherein said radiating means includes means for eliminating standing waves.

References Cited in the file of this patent

UNITED STATES PATENTS

| 2,052,375 | Wunsch et al. | Aug. 25, 1936 |
| 2,091,562 | Palmer | Aug. 31, 1937 |
| 2,470,511 | McDill | May 17, 1949 |
| 2,874,564 | Martin et al. | Feb. 24, 1959 |

OTHER REFERENCES

Abello: "Absorption of Ultrasonic Waves by Various Gases," pages 1083–1091 of Physical Review for June 1928.

Stott: article entitled "Sonic Gas Analyzer for Measurement of $CO_2$ in Expired Air," pages 914 and 915 of The Review of Scientific Instruments for November 1957.

Hedrich et al.: article entitled "Sound Velocity as a Measurement of Gas Temperature," pages 383–392 of Temperature, Its Measurement and Control, vol. 2, published 1955 by Reinhold Publishing Corp.

UNITED STATES PATENT OFFICE
CERTIFICATION OF CORRECTION

Patent No. 3,011,718 December 5, 1961

Ernest A. Joerren et al.

It is hereby certified that error appears in the above numbered patent requiring correction and that the said Letters Patent should read as corrected below.

Column 3, line 51, for "exciting" read -- exacting --; column 5, line 37, and column 6, line 5, for "line", each occurrence, read -- live --.

Signed and sealed this 17th day of April 1962.

(SEAL)
Attest:

ESTON G. JOHNSON
Attesting Officer

DAVID L. LADD
Commissioner of Patents

UNITED STATES PATENT OFFICE
CERTIFICATION OF CORRECTION

Patent No. 3,011,718            December 5, 1961

Ernest A. Joerren et al.

It is hereby certified that error appears in the above numbered patent requiring correction and that the said Letters Patent should read as corrected below.

Column 3, line 51, for "exciting" read -- exacting --; column 5, line 37, and column 6, line 5, for "line", each occurrence, read -- live --.

Signed and sealed this 17th day of April 1962.

(SEAL)
Attest:

ESTON G. JOHNSON
Attesting Officer

DAVID L. LADD
Commissioner of Patents